US007536296B2

(12) United States Patent
Badino

(10) Patent No.: US 7,536,296 B2
(45) Date of Patent: May 19, 2009

(54) AUTOMATIC SEGMENTATION OF TEXTS COMPRISING CHUNKS WITHOUT SEPARATORS

(75) Inventor: Leonardo Badino, Turin (IT)

(73) Assignee: Loquendo S.p.A., Turin (IT)

( * ) Notice: Subject to any disclaimer, the term of this patent is extended or adjusted under 35 U.S.C. 154(b) by 438 days.

(21) Appl. No.: 10/556,940

(22) PCT Filed: May 28, 2003

(86) PCT No.: PCT/EP03/05627

§ 371 (c)(1),
(2), (4) Date: Nov. 16, 2005

(87) PCT Pub. No.: WO2004/107202

PCT Pub. Date: Dec. 9, 2004

(65) Prior Publication Data

US 2007/0118356 A1 May 24, 2007

(51) Int. Cl.
G06F 17/27 (2006.01)
G06F 17/20 (2006.01)

(52) U.S. Cl. .............................. 704/9; 704/1

(58) Field of Classification Search ............ 704/1, 704/2, 3, 4, 5, 7, 8, 9, 10, 207, 211, 231, 704/235, 236, 240, 242, 243, 246, 249, 251, 704/252, 254, 255, 256, 257, 258, 260, 266, 704/267, 270, 275, 276, 277, E13.011, E13.012, 704/E13.013, E15.003, E15.004, E15.005, 704/E15.008, E15.014, E15.018, E15.02, 704/E15.022, E15.023, E15.024, E15.025, 704/E15.028, E15.04, E15.045; 717/114; 707/2, 3, 4, 5, 6, 10, 102, 104.1, E17.039, 707/E17.058, E17.084, E17.103; 400/109, 400/110, 484, 486, 487, 489; 382/177, 181, 382/185, 186, 187, 189, 228, 229; 345/156, 345/157, 168, 171, 173, 467, 471, 472.3

See application file for complete search history.

(56) References Cited

U.S. PATENT DOCUMENTS

| 5,806,021 | A | * | 9/1998 | Chen et al. | 704/9 |
|---|---|---|---|---|---|
| 6,052,657 | A | * | 4/2000 | Yamron et al. | 704/9 |
| 6,173,252 | B1 | | 1/2001 | Qiu et al. | |
| 6,848,080 | B1 | * | 1/2005 | Lee et al. | 715/533 |
| 6,904,402 | B1 | * | 6/2005 | Wang et al. | 704/10 |

OTHER PUBLICATIONS

Chen et al, "Word Identification for Mandarin Chinese Sentences", Proc. of COLING-92, pp. 101-107, 1992.*

(Continued)

Primary Examiner—David R Hudspeth
Assistant Examiner—Samuel G Neway
(74) Attorney, Agent, or Firm—Finnegan, Henderson, Farabow, Garrett & Dunner, L.L.P.

(57) ABSTRACT

Syntagms of a text including individual elements written without separators are segmented into chunks having strings including at least one individual element, such as an ideogram of the Mandarin Chinese language. A lexicon is defined including a set of strings, each string having at least one of the individual elements. The syntagm, being segmented, is orderly searched on an element-by-element basis by searching within the lexicon strings corresponding to any of the chunks. In the case of a positive search result, the corresponding chunk located is stored with an associated cost. A check is made as to whether the chunk located was already present in the lexicon. If the chunk located was already present, the cost associated therewith is reduced. A plurality of candidate segmentation sequences are thus generated, each corresponding to a respective segmentation pattern having associated a corresponding accrued cost. The candidate sequence having the lowest associated cost is selected as the final result of segmentation.

22 Claims, 4 Drawing Sheets

OTHER PUBLICATIONS

Figure 3:
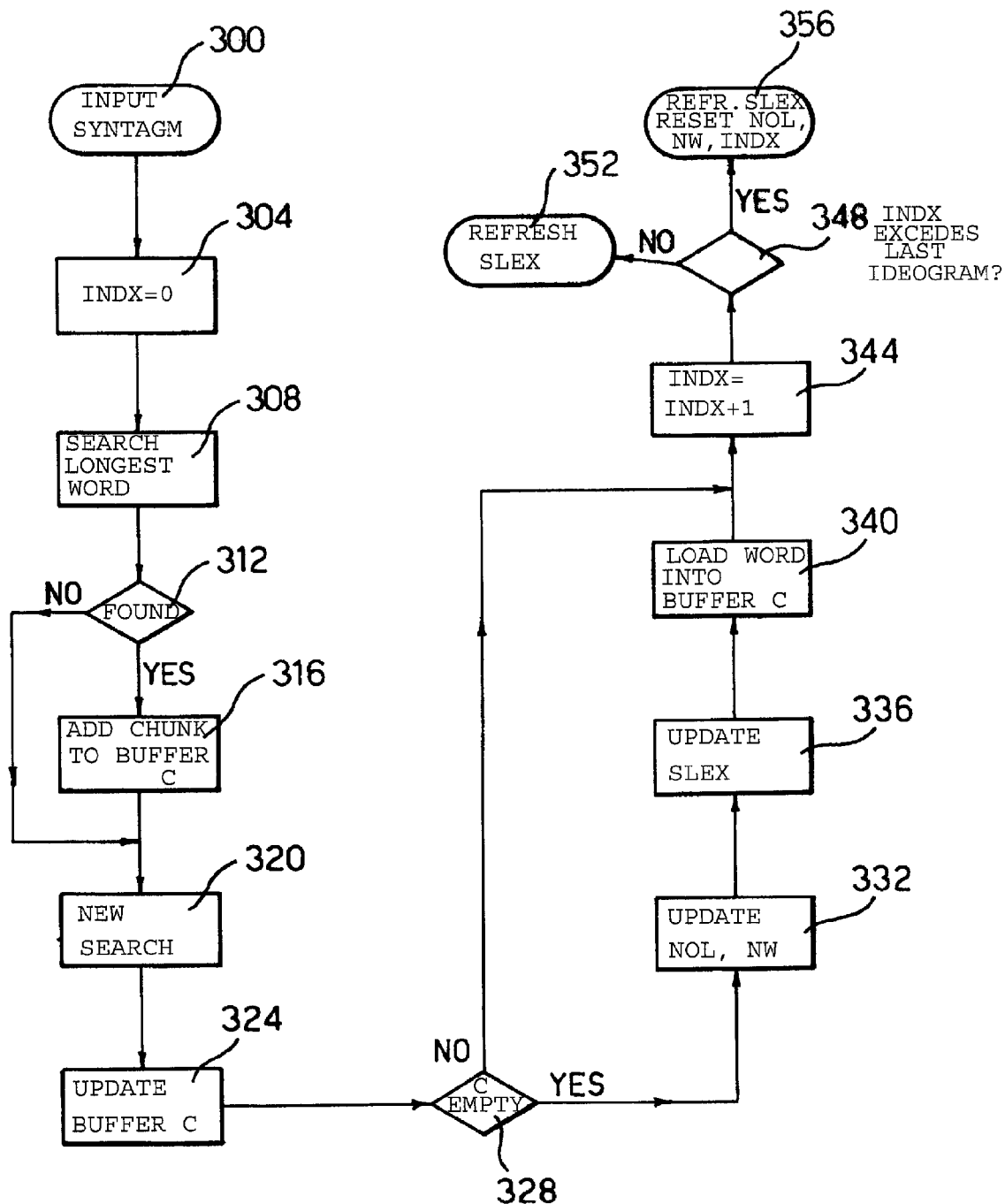

Sproat et al.; "A Stochastic Finite-State Word-Segmentation Algorithm for Chinese"; Computational Linguistics, vol. 22, No. 3, pp. 378-402, (1997).

Tsai; "MMSEG: A Word Identification System for Mandarin Chinese Text Based on Two Variants of the Maximum Matching Algorithm"; Chih-Hao Tsai's Technology Page, http://www.geocities.com/hao510/mmseg/, 17 pages, retrieved on Feb. 5, 2004.

Yu et al.; "Some Problems Fo Chinese Segmentation"; Institute of Computational linguistics, Peking University, http://web.archive.org/web/2003032215103/http://icl.pku.edu.cn/yujs/papers/pdf/onseg.pdf, retrieved on Feb. 5, 2004.

European Patent Office Abstract of Chinese Application No. 1 063 370 "Roman Alphabetic Phonetic Spelling Method and its Applicable Input Equipment for Chinese Character", (1992).

Nie et al.; "Unknown Word Detection and Segmentation of Chinese Using Statistical and Heuristic Knowledge"; Communications of COLIPS, vol. 5, Nos. 1 & 2, pp. 47-57, (1995).

* cited by examiner

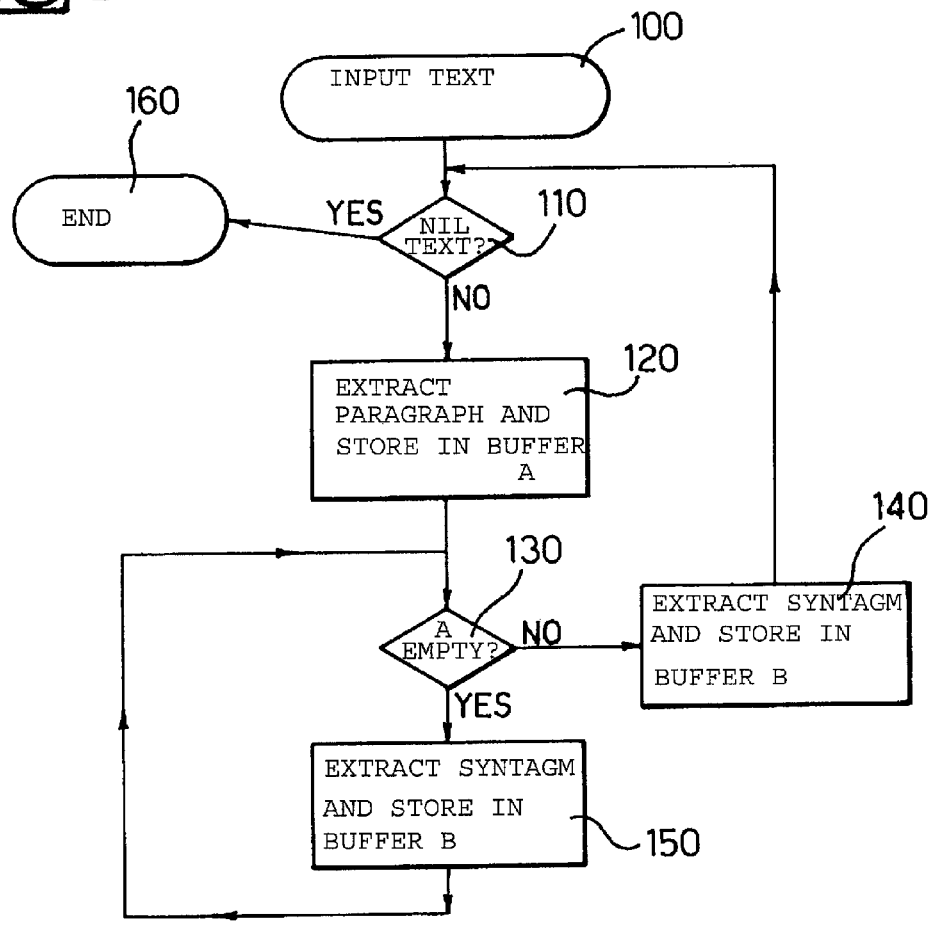
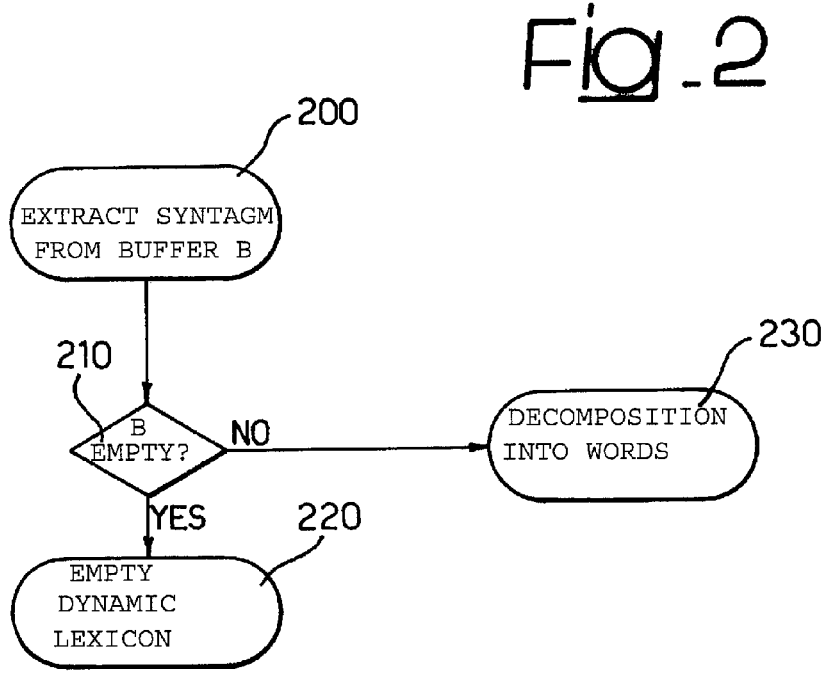

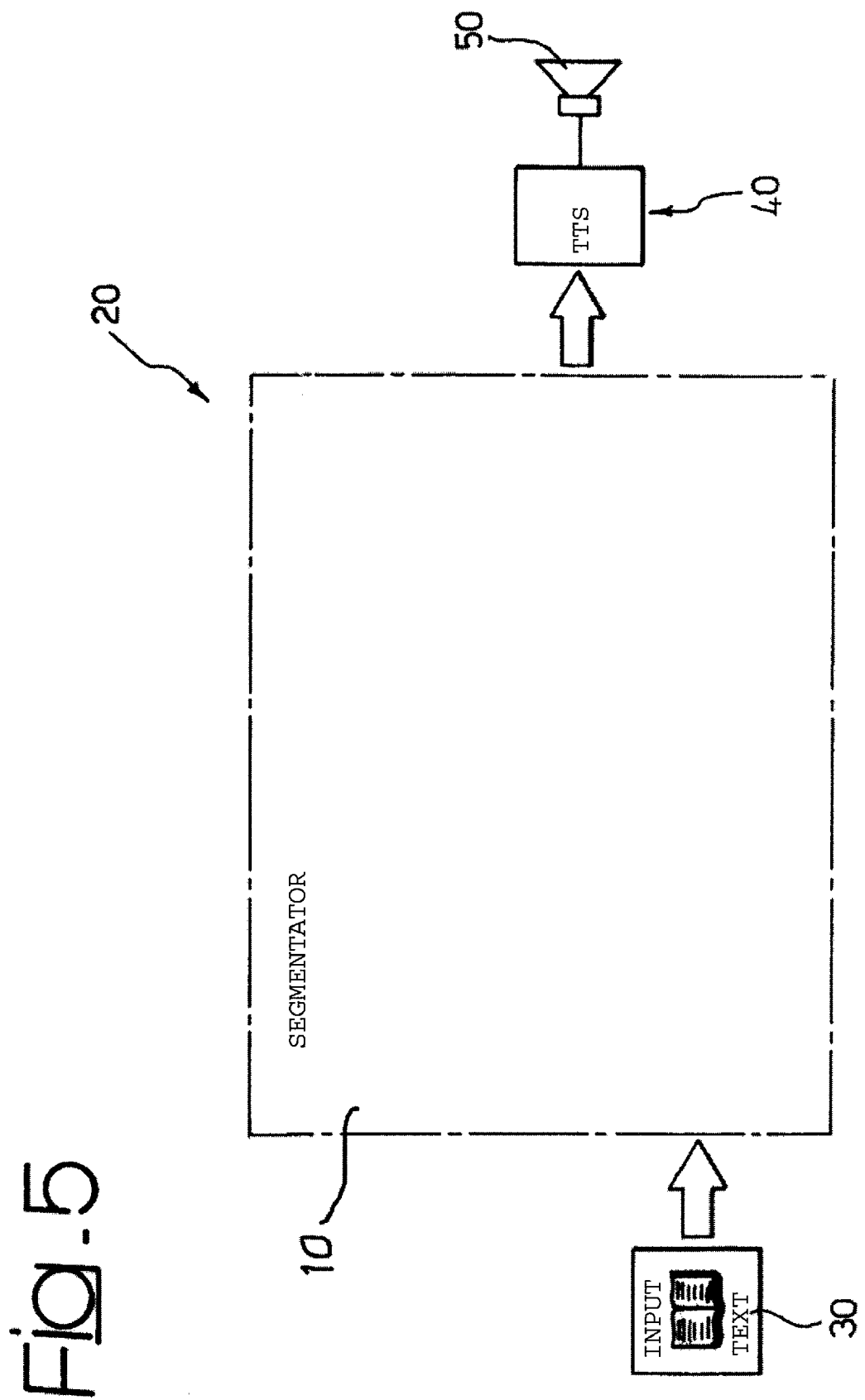

AUTOMATIC SEGMENTATION OF TEXTS COMPRISING CHUNKS WITHOUT SEPARATORS

CROSS REFERENCE TO RELATED APPLICATION

This application is a national phase application based on PCT/EP2003/005627, filed May 28, 2003, the content of which is incorporated herein by reference.

FIELD OF THE INVENTION

The invention relates to the segmentation of texts in languages comprising chunks written without separators such as e.g. spaces, hyphens or the like. Exemplary of such a language is the Mandarin Chinese language where chunks are typically represented by ideograms.

As is well known to those skilled in the art of speech synthesis, by "chunk" an element of speech is intended that more commonly corresponds to a word. In addition to Mandarin Chinese other languages exist, however, where a single word may in fact comprise several chunks: a typical example of this is German, where complex words such as "Patentübereinkommen" exist that, even though comprising two distinct chunks, namely "Patent" and "Übereinkommen" are written as a single work without separators.

The rest of this description will however be made (without this having to be construed as limiting the scope of application of invention) by referring to Mandarin Chinese, as this is one of the languages to which the invention may be most beneficially be applied.

DESCRIPTION OF THE RELATED ART

The written form of the language represents a basic difficulty for the layman wishing to learn the Chinese language. In fact, the set of the "letters" for Chinese includes about 45 thousand ideograms ("hanzhi" in Chinese). A good deal of these ideograms are words (words comprised of a single letter) related to objects no longer existing and which, therefore have, become practically useless. A current estimate is that in order to be in a position to read a Chinese newspaper the knowledge of about 4000 ideograms may suffice.

Be it 4000 or 40,000 ideograms, the order of magnitude is in any case much larger than the set of characters of Indo-European languages.

From this, a basic difficulty arises in developing systems for the text-to-speech synthesis of Chinese. In fact for Indo-European languages coding a single character by means of a binary digit including eight bits (i.e. a byte) according to the ISO standard will generally do. Conversely, for Chinese at least two bytes are required for coding each single ideogram.

The ISO standard does not provide for such a coding, but alternative coding techniques that may solve exist, as witnessed e.g. by the coding techniques known as Unicode, GB and BIG5.

Resorting to "pinyin" can somehow palliate the problem of coding. Pinyin is a form of phonetic transcription/transliteration based on Latin characters showing how Chinese words are pronounced. Pinyin transcription is provided in textbooks teaching the basics of the Chinese language and in Chinese dictionaries and, as such, is known to a good deal of Chinese speakers.

Another basic feature of the Chinese Mandarin language is that ideograms (i.e. the chunks of which the language is comprised) are written without separators. Consequently, identifying each single word within a sentence is far from easy in that each word may in fact be comprised of one or more hanzhis.

One may be erroneously led into believing that this problem could be easily circumvented by simply transcribing a character (i.e. an ideogram) at a time without concerns as to where a certain word ends and a new one begins.

In actual fact, in order to achieve an acceptable quality in speech synthesis, it is necessary that (even if the ideograms are transcribed in pinyin form) the text should be decomposed into single words.

This need is dictated by a number of factors,
 each single ideogram may have different forms of pronunciation depending on the words it belongs to;
 certain phonologic and phonetic rules depend on correct word separation: for instance a so-called tonal sandhi phonologic rule provides that in the presence of two syllables each conveying a third tone, the former will change its tone if the two syllables belong to the same word; and
 the information relating to each word is necessary in order to permit a correct grammatical and syntactic-prosodic analysis.

To sum up, an efficient arrangement for segmenting the text into chunks is a basic requirement for a truly satisfactory text-to-speech synthesis of the Mandarin Chinese language.

The known solution for segmenting into chunks the Mandarin Chinese text can be essentially subdivided into three categories namely:
 purely statistic algorithms, such as those implemented via a so-called classification and regression tree (CART),
 algorithms based on lexical rules, and
 algorithms combining the two previous solutions.

A first approach (frequently referred to as maximum matching segmentation or MMS) provides for a sentence to be segmented into words on the basis of a given lexicon by trying to resolve as best as possible any ambiguity related to a given sentence being adapted to be decomposed in several ways, thereby extracting different words.

In order to resolve such an ambiguity, heuristic solutions are frequently used such as the maximum matching criterion possibly further refined by other criteria. Maximum matching is based on the recognition of the fact that, as a general rule, the probability that a given sequence of ideograms belongs to a single word within the lexicon is higher than the probability that such a sequence corresponds to a plurality of shorter words concatenated within the text.

In the easiest versions, the algorithm searches, starting from the beginning of the sentence, and by resorting to its own lexicon, the word comprised of the highest number of ideograms. After locating such a word, the algorithm analyses the ideogram immediately next to the word just located and starts the search again.

Mixed approaches provide for a fixed cost being associated to each word. This cost is allotted by following a metrics that can be related to the frequency of appearance of the word in a given language or the probability that the grammatical category to which the word belongs may appear within the syntactic context of the sentence.

Among the various types of segmentations defined for a given sentence, the one having a minimum cost is than selected.

Exemplary of such prior art approaches are e.g. the article by R. Sproat et al. "A Stochastic Finite-State Word-Segmentation Algorithm for Chinese", Computational Linguistics, Volume 22, Number 3, 1997 pages 378-402 and U.S. Pat. No. 6,173,252.

Specifically, the arrangement disclosed in the article by Sproat et al. provides for a cost function being applied that is inversely proportional to the frequency of appearance of a given word in the respective vocabulary.

Conversely, the arrangement of U.S. Pat. No. 6,173,252 is essentially of the syntax based type, i.e. of the kind where the cost/weight functions used are related i.e. to commonly committed error strings, names of people, places and organisations, numbers, and combinations of the numbers and measure words as ordinary segmentation units along with words in a regular dictionary.

OBJECT AND SUMMARY OF THE INVENTION

The need therefore exists for improved solutions for text-to-speech synthesis of languages that (like the Mandarin Chinese language) include chunks without separators.

The object of the present invention is to provide such an improved arrangement.

According to the present invention, that object is achieved by means of a method having the features called for in the claims that follow.

The invention also relates to a segmentator operating according to such a method, the segmentator being preferably in the form of a suitably programmed general-purpose computer. For that reason the invention also relates to a computer program product loadable in the memory of a computer and including software code portions for performing the method of invention when the product is run on a computer. Additionally, the invention covers a text-to-speech synthesis system including the segmentator referred to in the foregoing.

A significant feature of the invention lies in the different metrics used with respect to the prior art. Specifically, the invention takes into account the semantic context of each single word. In that way, segmentation of a sentence in a text is caused to depend on the previous sentences (provided a semantic correlation exists) and the cost allotted to each word varies as a function of the words found in the previous segmentations.

All the decompositions thus obtained may thus be mapped in a lattice or matrix where each element is comprised of a word plus the respective cost. Subsequently, the segmentation having the lowest cost is chosen, e.g. by using dynamic programming.

The invention will now be described by referring to the enclosed figures of drawing, wherein:

FIGS. 1 to 4 are each constituted by a flow chart containing a sequence of steps performed in the arrangement disclosed herein. and FIG. 5 is a basic schematic block diagram of a corresponding system.

DETAILED DESCRIPTION OF A PREFERRED EMBODIMENT OF THE INVENTION

By way of introduction, a general description of the basic principles underlying the arrangement disclosed herein will be provided.

In brief, the text-to-speech synthesis arrangement disclosed herein is based on a lexical approach substantially related to the maximum matching approach.

As a first step the input text is subdivided into syntagms following some basic rules, where a syntagm is a portion of text, for example a sentence delimited by punctuation marks. Thereafter each syntagm is sent in its turn to the segmentation module.

More specifically, starting from the first ideogram (i.e. chunk) in the syntagm, "special" sequences corresponding to defined rules (such as dates, hours, and so on) are searched. If located, such sequences are allotted a defined cost.

Also the longest word of the lexicon starting with that ideogram is searched, then the second longest one, and so on by ending up with the ideogram itself.

Those words that are found in the lexicon all have the same cost (for instance a cost equal to 5), higher than the cost allotted to special sequences (for instance cost equal to 3). To those words that are not located (i.e. found) either by searching on the basis of rules or by searching in the lexicon, a higher cost is allotted with respect to the costs considered in the foregoing.

In that way, a sort of lattice or matrix is created having as many columns as the ideograms in the syntagm, whereby an ideogram can be associated to each column. The number of lines varies depending on the columns and corresponds to the number of words located in the lexicon having the ideogram corresponding to the column as the first ideogram.

If no words are found starting from a given column, the number of lines is fixed (with some exceptions) and includes a unitary length word, then the word with the subsequent ideogram and so on up to a given length.

In the following an example is provided where in the place of Chinese ideograms Latin characters such as A, B, C, D, etc. . . . are used as representative of the individual elements comprising the syntagms subject to segmentation.

It will be assumed that a lexicon Lex is available including a number of imaginary words:

Lex={A, ABC, BC, CD, CDAC, D} and the sentence ABCDACEFD is considered.

The lattice or matrix will be arranged as follows:

| columns-lines | 0 | 1 | 2 | 3 | 4 | 5 | 6 | 7 | 8 |
|---|---|---|---|---|---|---|---|---|---|
| | ABC | BC | CDAC | D | A | CD | E | F | D |
| | A | | CD | | | | EF | FD | |
| | | | | | | | EFD | | |

In the positions designated 6 and 7 no words were found, whereby to those words in columns 6 and 7 a cost is allotted which increases as the length increases and that is higher than the cost allotted to a word found in the lexicon with the same length.

In this example, as is the case in almost all sentences of the Chinese language, various segmentations are possible e.g. ABC-D-A-EF-D or AB-CDAC-E-F-D.

The arrangement disclosed herein looks for the sequence with the lowest cost. This is done preferably by means of dynamic programming, which can be easily resorted to once the lattice or matrix has been created. Dynamic programming leads to substantial savings in terms of calculations in comparison with "brute force" approaches, where all the possible sequences and the respective costs are determined.

Starting from the last position in the sentence/syntagm (for instance position 8) the sequence with the lowest cost is searched for each word in the column. By referring to the foregoing this is, at the beginning, D.

A given word identified by the line j and the column i (hereinafter referred to simply as $W_{i,j}$) the lowest cost sequence starting from $W_{i,j}$ is given by the following formula:

$$\text{Mincost} W_{i,j} = \text{Min}_{(k)} \{ \text{Cost} W_{i,j} + \text{MinCost} W_{(i+\text{length} W_{i,j}),k} \}$$

Situations may certainly exist where, starting from the word $W_{i,j}$, several possible sequences exist with the same cost, especially if the word is at the end of the syntagm.

In such a situation, at least two heuristic methods can be used for selecting a sequence. A first option is to select the sequence with the longer first word. An alternative is to select the sequence having the lower length variance.

By way of further explanation, the arrangement just described will now be compared with a solution operating on the basis of a (purely) lexical approach.

By way of example, the sentence/syntagm ABCDAC will be considered for segmentation using a maximum matching approach by referring to the same lexicon considered in the foregoing.

The sequence in question may in fact be segmented in a single way only, namely AB-CDAC. However, a maximum matching solution would generally locate the incomplete sequence ABC-D-A and thereafter stop without having located the right sequence.

Of course, resorting to a backtracking step could dispense with this drawback but this would entail a significant burden in terms of computational complexity, which would in turn adversely affect what is currently regarded as the strong point of a maximum matching approach.

The arrangement known as MMS is essentially a basic algorithm that makes use of the heuristic concept of maximum matching.

Exemplary of such an approach is the solution known as MMSEG (for general information concerning MMSEG reference can be made e.g. to the article: "MMSEG: A Word Identification System for Mandarin Chinese Text Based On Two Variations of the Maximum Matching Algorithm" by Chih-Hao Tsai available at: http://input.cpatch.org/cutphase/mmseg.htm.

MMSEG is certainly one of the most effective segmentators that make use of the maximum matching concept. However, like the MMS (even though with a much lower probability) it may fail to locate a correct sequence even though one exists. Also in this case backtracking may represent a solution to that problem.

Specifically, MMSEG chooses, starting from the beginning of the syntagm, the first word in a sequence of three chunks having the maximum length. For instance, by assuming a lexicon Lex={A, B, AB, CD, E, EF} and the sentence ABCDEFABCD, MMSEG searches for all possible sequences comprised of a window of three chunks, that is:

(1) A-B-CD
(2) AB-CD-E
(3) AB-CD-EF

Subsequently, it selects the first word of the longest sequence (the sequence 3) that corresponds to AB.

Consequently, MMSEG achieves good results. However, in addition to having an appreciable computational load, it has the limitation of failing to consider all the possible sequences with the ensuing risk of failing to apply in a coherent way the heuristic criterion of maximum matching.

By way of further example, one may refer to the lexicon Lex=(A, AB, BC, CD, DE, EF, GH, I, FGHI) and the sentence ABCDEFGHI. The MMSEG arrangement will be unable to locate the word FGHX even though this is included in an acceptable sequence (A-CD-DE-FGHI).

The arrangement disclosed herein dispenses with this drawback, in that it can take into account all the possible sequences without excluding any sequence. In that way the risk is avoided of failing to detect the words that have a high probability of being the correct ones according to the maximum matching criterion.

So-called statistical algorithms slightly differ from those algorithms having a lexical basis due to their improved behaviour in segmenting unknown words (that is words that are not included in the training corpus), such as personal names. The arrangement disclosed herein partially suffers from the same disadvantage, but may be supplemented with rules that make it easier to recognise specific tokens (for instance: dates, hours, and so on).

Again it is recalled here that a significant feature of the arrangement disclosed herein lies in the different metrics used with respect to the prior art.

Specifically, the arrangement disclosed herein takes into account the semantic context of each single word. Segmentation of a sentence in a text is thus caused to depend on the previous sentences (provided a semantic correlation exists) and the cost allotted to each word varies as a function of the words found in the previous segmentations.

All the decompositions thus obtained may thus be mapped in a lattice or matrix where each element is comprised of a word plus the respective cost. Subsequently, the segmentation having the lowest cost is chosen, e.g. by using dynamic programming.

Turning now to the flow charts of FIGS. 1 to 4, it will be assumed that the segmentator disclosed herein accepts as an input a text coded with the Unicode system (or a similar system), such text being subdivided into paragraphs, that in turn are subdivided into "syntagms" that is text strings delimited by specific character sequences (e.g. a stop or comma followed by a blank or a new line, exclamation mark or question mark, a blank between two ideograms, and so on).

In FIG. 1, a step 100 generally designates the step corresponding to the text being input to the system while step 110 is a step wherein a check is made that the text in question is not nil. If this is the case then the process ends at a step 160.

Otherwise, a paragraph is extracted from the text and loaded into a buffer A (FIG. 5). This occurs in a step designated 120.

In a step 130, the buffer A is checked to ascertain whether it is empty.

If the buffer A is not empty, a syntagm is extracted and inserted into the buffer B. This occurs in a step 140 after which the system evolves again upstream of the step 110.

If the buffer A is empty the system evolves to a step 150 and then back upstream of the step 130.

The system moving back to step 130 once the syntagm is inserted into the buffer B means that a step 140 is provided, step 140 being a waiting step intended to make sure that all syntagms in the buffer B have been processed by the segmentator to go back to step 110 after emptying the buffer B.

Those of skill in the art will promptly appreciate that subdividing the text in paragraphs is not strictly necessary. In fact, the whole input text can be regarded as a single paragraph.

Once the buffer B has been filled with the syntagms of the current paragraph, each single syntagm is extracted in a step 200 (FIG. 2) after which, in a step 210, the buffer B is checked to ascertain whether it is empty. If this is the case the dynamic lexicon (see below) is emptied in a step 220 to evolve back to step 160. If step 210 yields a negative result, the system evolves to the proper decomposition into words as exemplified by step 230.

The input of the flow chart of FIG. 3 is the single syntagm, designated 300. In a step 304, a pointer (INDX) is set to the first character of the syntagm (pointer set to 0).

In a step 308 the longest possible string is searched starting from the ideogram in the position designated by the pointer INDX.

In this kind of search, so-called "special" chunks are searched: these includes e.g. dates, hours, numbers—both as ideograms and as Latin character—as well those characters sequences different from ideograms.

If the step 312 indicates a positive outcome for the search, a new chunk is added to a buffer C (see again FIG. 5) having associated a corresponding fixed cost CF. This occurs in a step designated 316.

Conversely, if the search had a negative result (negative outcome of step 312) the system evolves directly to a step 320 where a new search is carried out.

In this phase the string is extracted from the text comprised between the ideogram in the position indicated by the pointer INDX up to a given ideogram (for instance the eleventh ideogram) if this is not the last ideogram in the syntagm. If the converse is true, the string is the one between INDX to the end of the syntagm.

The string thus obtained is searched among the words included in a static lexicon.

If the search yields a positive results, the word located is written into the buffer C together with the respective cost that is equivalent to a constant value designated CM (which is generally higher than CF). Subsequently, the string is shortened by eliminating the last ideogram on the right and the search is repeated.

Once this search is completed, the buffer C is updated by inserting all the words located during the together with their costs, namely CM. This occurs in a step designated 324.

Subsequently, in a step 328, if at least one of the two searches has yielded a positive result the system evolves towards a step designated 332. Alternatively, the system evolves directly towards a step 344. The cost of each word present in buffer C is updated to the correspondent cost in SLEX if the word is present in SLEX and if its length is at least two characters.

In the step 332, the values for the number of words located already present in previous syntagms (NOL) plus the count of all the words already located (NW) are updated.

A step designated 336 corresponds to updating a dynamic lexicon (SLEX) which will be better detailed in the following by referring to the flow chart of FIG. 4.

Subsequently, in a step 340, if neither search has yielded a result, the word comprised of the single ideogram in the position designated by the pointer INDX is loaded into the buffer C with a cost CS that is higher than CM. Still in the step 340 all the words of the buffer C are transferred into a lattice or matrix RET (this corresponds to the tables previously reported in the description) at the column designated by the pointer INDX.

Thereafter, in the step 344, the pointer INDX is increased by 1 and a check is made in a step 348 if the resulting value exceeds the last ideogram in the syntagm.

If this is not the case, a refresh of the dynamic lexicon SLEX takes place wherein all the costs of each and every entry are increased by a constant value while dispensing with the chunks having a cost higher than CM. This take place in a step designated 352.

Conversely, if the updated value of INDX exceeds the last ideogram in the syntagm, in a step 356, the dynamic lexicon is subjected to a refresh while the values for NOL, NW and INDX are reset to zero. At that point, the system evolves back to step 200.

Figure 4:
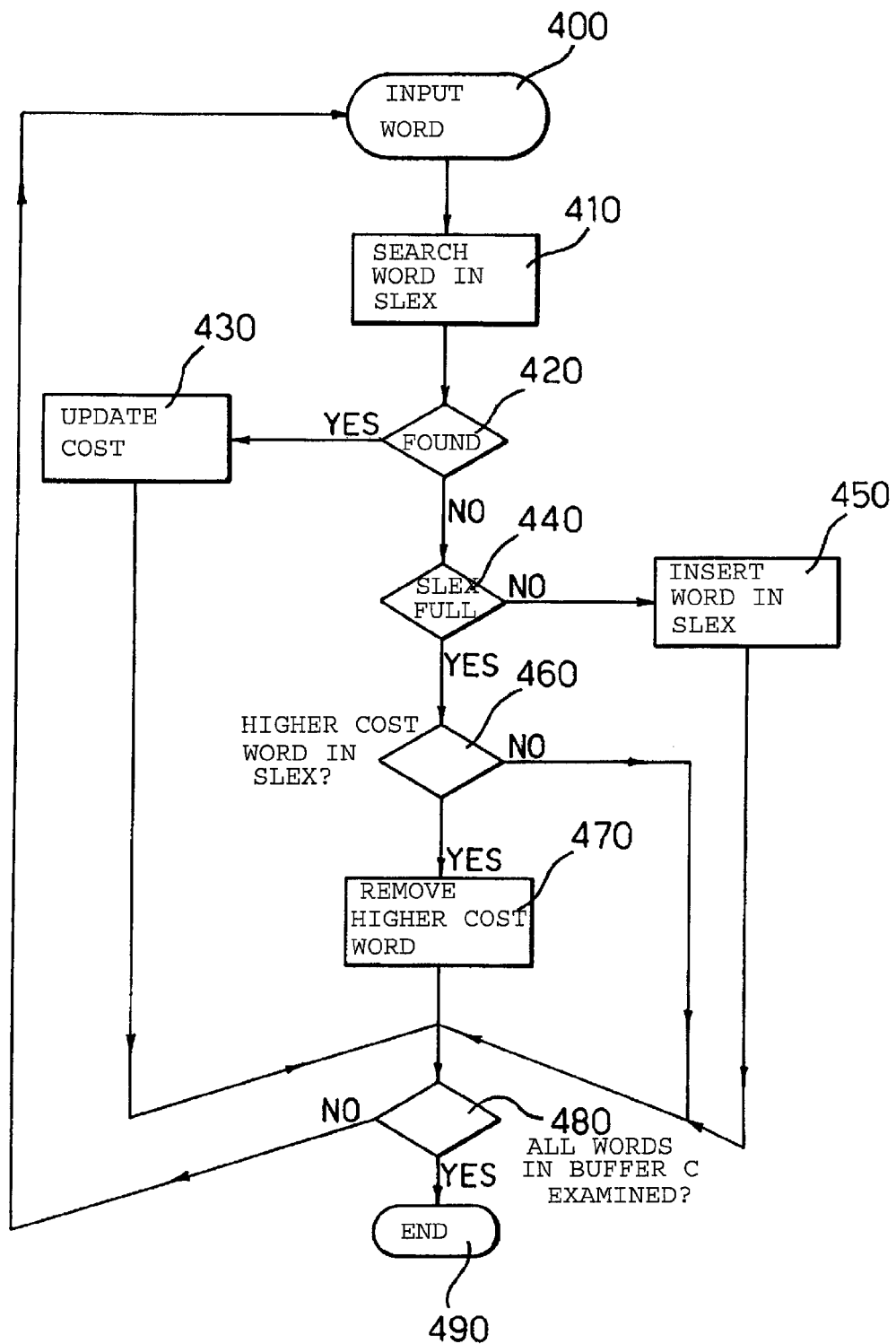

The diagram of FIG. 4 details the updating process of the dynamic lexicon SLEX.

Each single word contained in the buffer C (located in the step designated 400) is searched, in a step 410, in the dynamic lexicon that is completely emptied as a new paragraph starts to be processed (step 420).

If the word was already present in the dynamic lexicon, the relative cost is decreased by a constant value DC in a step 430. If the word was not present in the dynamic lexicon, a check is made in a step 440 if the dynamic lexicon is full.

If this is not the case, in a step 450 the word is inserted together with the relative cost (CM or CF) decreased by a value DCI.

Conversely, if the dynamic lexicon SLEX is full, a check is made in a step 460 if any words exist having a cost higher than CM.

If this is the case in a step 470, that word is substituted by the new word with a cost defined as in the previous step 450.

If no such word exists having a cost higher than CM, the system evolves directly to step 480. This is essentially a check in order to ascertain whether all the words in the buffer C have been examined.

If this is not the case, the system evolves back to step 400. If, conversely, all the words in the buffer C have been examined, the system evolves to a final step 490.

It will be appreciated that the cost of each word in the dynamic lexicon is never less than zero.

Once the lattice or matrix RET has been completed, the minimum cost sequence is to be located. Resorting to dynamic programming preferably does this.

Specifically, for each word $W_{i,j}$ in the lattice the minimum cost is calculated for the sequence starting from $W_{i,j}$ based on the following formula:

$$\text{Mincost} W_{i,j} = \text{Min(over } k)\{\text{Cost} W_{i,j} + \text{MinCost} W(i+\text{length} W_{i,j}), k\}$$

Where Mincost indicates a minimum cost, Min designates the minimum function (over k) and the length considered is the length of the word $W_{i,j}$.

If the word in question contains more than two ideograms, the cost factor designated $\text{Cost} W_{i,j}$ is a function of the ratio of NOL to NW that gives a quantitative meaning to the semantic correlation of the current syntagm with the previous syntagms. Additionally, this ratio varies depending on whether the word is already present in the dynamic lexicon SLEX.

Preferably, the function is defined as follows:

if the word was not previously included in the dynamic lexicon, then $$\text{Cost} W_{i,j} = CSLEX$$

otherwise $$\text{Cost} W_{i,j} = CSLEX + (Cfs - CSLEX)*(1 - NOL/NW)/K$$

In the two equations CSLEX represents the cost of the word in the dynamic lexicon (SLEX) while Cfs is equal to CM o CF depending on whether the word was located by means of the second search (B) or the first search (A) while K is a constant value.

These costs pertain to each character.

Those of skill in the art will promptly appreciate that the flow charts of FIGS. 1 to 4 directly mirror into corresponding functional blocks of a respective segmentator 10 adapted to be implemented based on the architecture schematically shown in FIG. 5 by resorting to a computer such as a dedicated processor or a suitably programmed general-purpose computer/processor or any equivalent data processing structure.

The segmentator 10 is in turn adapted to constitute a basic building block of a text-to-speech synthesis system including a number of other subsystems components generally designated 30 and 40.

Of these subsystems (that are per se known in the art, thus making it unnecessary to provide a detailed description herein) subsystem 30 includes a text input facility such as an OCR reader, a keyboard/keypad or any other text source adapted for inputting text such as Mandarin Chinese text into the segmentator 10.

Such an input facility may include (if not included in the segmentator 10) processing blocks—not shown, but known in the art—adapted e.g. for coding the individual elements (i.e. the ideograms) of which the text is comprised into bit strings using coding techniques such as the ISO standard, or the Unicode, GB or BIG5 coding techniques. The choice of the coding technique may possibly depend on the ideograms having been subject to pinyin phonetic transliteration in view of segmentation in the segmentator 10.

Reference 40 designates as a whole a speech synthesis subsystem—again per se of a known type—adapted to transform the sequences resulting from segmentation within the segmentator 10 into utterance synthesis data adapted to generate a corresponding audio speech signal emitted e.g. via a speaker 50.

Of course, without prejudice to the underlying principles of the invention, the details and the embodiments may vary, also significantly, with respect to what has been described by way of example only, without departing from the scope of the invention as defined by the annexed claims.

The invention claimed is:

1. A method of segmenting into chunks syntagms of a text including individual elements written without separators, said chunks comprising strings including at least one of said individual elements, including the steps of:
    defining a lexicon including a set of strings, each string comprising at least one of said individual elements, wherein the strings in said lexicon are at least partly representative of said chunks, the lexicon also including a dynamic lexicon and a static lexicon;
    orderly searching the syntagm being segmented on an element-by-element basis by searching, within said lexicon, strings corresponding to any of said chunks, wherein, in the case of a positive search result, the corresponding chunk located is stored with an associated cost;
    checking whether the chunk located was already present in at least the dynamic lexicon and, in the case where the chunk located was already present, reducing the cost associated therewith;
    storing in a computer memory, as a result of said orderly searching, a plurality of candidate segmentation sequences, each corresponding to a respective segmentation pattern and having an associated corresponding accrued cost;
    selecting as the final result of segmentation the candidate sequence having the lowest associated accrued cost, and
    increasing said associated cost by a constant value at each new step in said searching on an element-by-element basis.

2. The method of claim 1, wherein, in the presence of two candidate sequences having the same associated cost, further comprising the step of selecting as a result of segmentation the candidate sequence selected from the group consisting of:
    the sequence having the longer first chunk, and
    the sequence having the lower length variance.

3. The method of claim 1, wherein, when at least one syntagm in said text has been previously segmented, further comprising the steps of determining at least one of:
    the number of chunks located in the instant syntagm that were already present in said at least one previously segmented syntagm, and
    the count of the chunks already found during the previous segmentation process.

4. The method of claim 3, wherein said sequence having the minimum associated cost is selected on the basis of a cost function including at least one of said number of chunks and said count.

5. The method of claim 3, wherein said sequence having the minimum associated cost is selected on the basis of a cost function including the ratio of said number of chunks and said count.

6. The method of claim 1, comprising the step of dispensing with those chunks having a cost higher than a given threshold when said associated cost is increased.

7. The method of claim 1, comprising, in the case of a positive search result, the step of shortening the string searched by eliminating one of the end elements thereof, the search being then repeated on the basis of said shortened string.

8. The method of claim 7, comprising the step of shortening said string by eliminating the rightmost element thereof.

9. The method of claim 1, comprising the step of managing the dynamic lexicon, said managing comprising the steps of:
    if the chunk located was already present in the dynamic lexicon, reducing by a constant value the cost associated thereto,
    if the chunk located was previously absent from the dynamic lexicon, checking whether the dynamic lexicon is full, and
    i) if the dynamic lexicon is not full, inserting the chunk located in the dynamic lexicon with the respective cost decreased by a constant value, and
    ii) if the dynamic lexicon is full, searching in the dynamic lexicon for any chunk having an associated cost higher than a given cost threshold and, if such a chunk is found, substituting the chunk located for such a chunk.

10. The method of claim 1, comprising the steps of:
    defining at least a part of said set of strings in said lexicon (LEX) as representative of special chunks corresponding to defined rules;
    orderly searching the syntagm being segmented on an element-by-element basis by searching within said lexicon at least one of:
    (A) the longest string corresponding to any of said special chunks, wherein, in the case of a positive search result, the corresponding chunk located is stored with an associated first cost (CF), and
    (B) the longest string corresponding to any of the other strings in said lexicon, wherein, in the case of a positive search result, the corresponding chunk located is stored with an associated second cost (CM), said second cost (CM) being higher than said first cost (CF),
        wherein if neither of said searches under (A) and (B) leads to a positive result, the individual element used as the starting element of the search is stored with an associated third cost (CS), said third cost (CS) being higher than said second cost (CM).

11. The method of claim 10, comprising the step of increasing said first, second and third costs by a constant value at each new step in said at least one search on an element-by-element basis.

12. The method of claim 11, comprising the step of dispensing with those chunks having a cost higher than a given threshold when said costs are increased.

13. The method of claim 12, wherein said given threshold is selected equal to said second cost.

14. The method of claim 10, wherein at least one syntagm in said text has been previously segmented, and comprises the steps of:
- determining the number (NOL) of chunks located in the instant syntagm that were already present in said at least one previously segmented syntagm and the count (NW) of the chunks already found during the segmentation process;
- selecting said sequence having the minimum associated cost on the basis of a cost function defined as follows:
- i) if the chunk located was not previously included in said lexicon $$\text{Cost } W_{ij} = CSLEX$$

ii) otherwise, $$\text{Cost} W_{ij} = CSLEX + (Cfs - CSLEX)*(1 - NOL/NW)/K$$

wherein Cfs is equal to said second cost (CM) or said first cost (CF) depending on whether the word considered was located by means of said second search (B) or said first search (A), K is a constant value, CSLEX is the cost associated with the chunk $W_{ij}$ in said lexicon, and NOL and NW are said number and said count, respectively.

15. The method of claim 1, comprising the step of coding said individual elements to bit strings using to at least one of an ISO standard, or Unicode, GB or BIG5 coding techniques.

16. The method of claim 1, wherein said individual elements correspond to ideograms.

17. The method of claim 16, wherein said ideograms are ideograms of Mandarin Chinese language.

18. The method of claim 17, comprising the step of transliterating said ideograms into pinyin phonetic transliteration before said syntagms are segmented.

19. The method of claim 10, wherein said special chunks are selected from the group: dates, hours and numbers.

20. A segmentator for segmenting into chunks syntagms of a text including individual elements written without separators, said chunks comprising strings including at least one of said individual elements, the segmentator including a data processing structure configured for carrying out the method of claim 1.

21. A text-to-speech synthesis system comprising:
- a text source for generating at least one text syntagm to be segmented into chunks, said syntagm including individual elements written without separators, said chunks comprising strings including at least one of said individual elements;
- a segmentator for receiving said at least one text syntagm, the segmentator including a data processing structure configured for carrying out the method of claim 1, thus generating as the final result of segmentation said candidate sequence having the lowest associated cost; and
- a speech signal generator for converting said sequence resulting from segmentation into a corresponding audio speech signal.

22. A computer memory encoded with a computer program product, the computer program product including software code portions for performing the steps of the method of any one of claims 1 to 5 and 6 to 16.

* * * * *